United States Patent
Hanyu

(10) Patent No.: US 7,286,262 B2
(45) Date of Patent: Oct. 23, 2007

(54) IMAGE FORMATION APPARATUS AND METHOD, AND COMPUTER PRODUCT

(75) Inventor: Hitomi Hanyu, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 1094 days.

(21) Appl. No.: 10/329,073

(22) Filed: Dec. 23, 2002

(65) Prior Publication Data

US 2003/0169439 A1 Sep. 11, 2003

(30) Foreign Application Priority Data

Dec. 25, 2001 (JP) .............................. 2001-392279

(51) Int. Cl.
G06F 15/00 (2006.01)
B41J 1/00 (2006.01)
G06K 9/00 (2006.01)

(52) U.S. Cl. .................. 358/1.9; 358/523; 358/525; 382/162; 382/167; 382/300

(58) Field of Classification Search .................. 358/1.9, 358/525, 518, 523; 345/601–602, 604; 382/167, 382/300, 162; 708/290
See application file for complete search history.

(56) References Cited

U.S. PATENT DOCUMENTS

| 5,325,474 A | 6/1994 | Kumazaki et al. |
| 5,357,583 A | 10/1994 | Sato et al. |
| 5,404,431 A | 4/1995 | Kumazaki et al. |
| 5,555,360 A | 9/1996 | Kumazaki et al. |
| 5,579,450 A | 11/1996 | Hanyu et al. |
| 5,697,712 A | 12/1997 | Sato et al. |
| 6,088,038 A | 7/2000 | Edge et al. |
| 2001/0033288 A1* | 10/2001 | Nabeshima .................. 345/601 |
| 2002/0048031 A1* | 4/2002 | Suwa et al. ................... 358/1.9 |

FOREIGN PATENT DOCUMENTS

| EP | 0779736 A2 | 6/1997 |
| EP | 0810777 A2 | 12/1997 |
| EP | 0868075 A2 | 9/1998 |
| EP | 0999696 A1 | 5/2000 |
| EP | 1014696 A2 | 6/2000 |
| JP | 7-325917 | 12/1995 |
| JP | 09-322005 | 12/1997 |
| JP | 10-294876 | 11/1998 |
| JP | 11-284873 | 10/1999 |
| JP | 2000-184219 | 6/2000 |

OTHER PUBLICATIONS

U.S. Patent Appl. No. 558,146 of Hanyu, filed Apr. 26, 2000, U.S. Appl. No. 09/558,146.
U.S. Patent Appl. No. 224,340 of Hanyu, filed Aug. 21, 2002, U.S. Appl. No. 10/224,340.

* cited by examiner

Primary Examiner—Kimberly Williams
Assistant Examiner—Charlotte M. Baker
(74) Attorney, Agent, or Firm—Cooper & Dunham LLP

(57) ABSTRACT

In an image formation apparatus, a matching engine converts the color in image data for a color image into an output color, a specific color determining device determines whether the color in the image data is a color (specific color) indicated by a point on a straight line connecting between an origin point and a point indicating an ink color in a color space, and a color profile interpolates the image data determined as the specific color only with other specific colors on the straight line where the specific color is located.

21 Claims, 10 Drawing Sheets

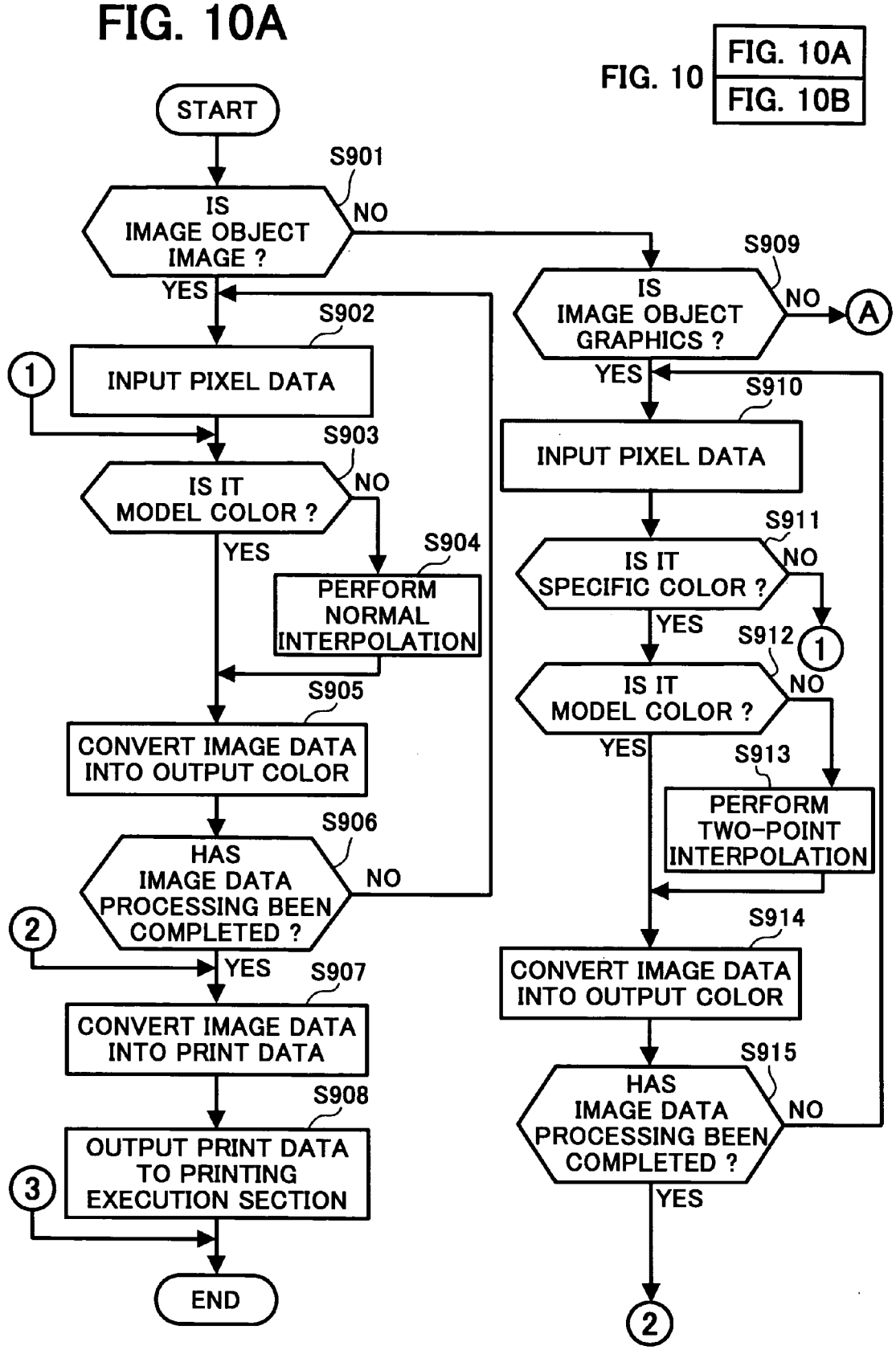

IMAGE FORMATION APPARATUS AND METHOD, AND COMPUTER PRODUCT

BACKGROUND OF THE INVENTION

1) Field of the Invention

The present invention relates to an image formation apparatus, an image formation method, and a program for allowing a computer to execute the method.

2) Description of the Related Art

Recently, there are many image formation apparatuses that form a color image, such as color copiers and color printers. Such a color image formation apparatus (for example, a color printer) often includes a powdered ink (toner) of a plurality of colors, for example, yellow (Y), magenta (M), cyan (C), and black (K). With such a color printer, a color image is digitalized, and the digitalized image data is input to the printer, and the color image is formed (printed) on a sheet of paper by each color toner or toners of a plurality of colors that are mixed, based on the image data.

Some of the color printers prints, for example, black or gray only with the K toner being the toner color. Printing only with one color toner can prevent occurrence of toner scattering or color unevenness caused by superposing the toners, and therefore an image having a neat impression can be formed. Further, in a color printer that forms images in which color continuity is valued, like a color picture, gray is often expressed by mixing each toner of C, M, Y, and K.

Color mixture by the color printer is carried out using a color conversion table. Most of the color conversion tables are a three-dimensional look-up table (LUT) for color conversion. The color conversion table is used for converting an input color determined by three elements, red (R), green (G), and blue (B), into an output color determined by C, M, Y, and K. Representative input colors (model colors) are, as shown in FIG. 11, discrete values indicated by points of intersection (black spots) of solid lines intersecting each axis of R, G, and B, and an output color corresponding to an input color (white spot) located between the model colors can be obtained by interpolation processing using some of the model colors. When the output color is determined by interpolating the model colors, the output color is adjusted taking the continuity with the model colors into consideration.

However, the output color obtained by the conversion generally changes due to a change in properties with time of the color printer and an individual difference between the color printers. Such a change occurs, for example, when a color image formed by a color printer at the time of shipment has a different hue from that of the 1000th color image formed based on the same image data, or when the hues of color images obtained by printing the same color image by a plurality of color printers are different from each other.

When the output color corresponding to each model color in the color conversion table changes, the output color obtained by interpolation using the model colors also changes. Therefore, the tone continuity between the output color obtained through interpolation and the output color corresponding to the model colors is disrupted. The disruption of the tone continuity is easily recognized by human, particularly in the gradation from a toner color to a color having the same hue (for example, from a toner color to white, or from a toner color to black), and may deteriorate the quality of the color image.

SUMMARY OF THE INVENTION

The present invention has been achieved in order to solve the above problems. It is an object of this invention to provide an image formation apparatus and an image formation method capable of forming a high quality image such that tone continuity between output colors can be maintained regardless of a change in properties with time of a color image formation device and an individual difference between color image formation devices, and a program for allowing a computer to execute the method.

The image formation apparatus according to one aspect of this invention comprises a color converting unit that converts a color in image data into an output color when a color image is to be output by using a plurality of ink colors or by mixing the ink colors, and an image data color determining unit that determines whether the color in the image data is a specific color, being a color indicated by a point on a straight line connecting between an origin point and a point indicating the ink color in a color space, or a non-specific color other than the specific color. When the color in the image data is to be interpolated, the color converting unit interpolates the image data determined as the specific color by the image data color determining unit, only with other specific colors on the straight line where the specific color is located.

The program according to another aspect of this invention, allows a computer to execute an image formation method. The method comprises steps of converting a color in image data to an output color when a color image is to be output by using a plurality of ink colors or by mixing the ink colors, and determining whether the color in the image data is a specific color, being a color indicated by a point on a straight line connecting between an origin point and a point indicating an ink color in a color space, or a non-specific color other than the specific color. When the color in the image data is to be interpolated, the color converting step includes interpolating the image data determined as the specific color at the determining step, only with other specific colors on the straight line where the specific color is located.

The image formation method according to still another aspect of this invention, comprises steps of converting a color in image data to an output color when a color image is to be output by using a plurality of ink colors or by mixing the ink colors, and determining whether the color in the image data is a specific color, being a color indicated by a point on a straight line connecting between an origin point and a point indicating an ink color in a color space, or a non-specific color other than the specific color. When the color in the image data is to be interpolated, the color converting step includes interpolating the image data determined as the specific color at the determining step, only with other specific colors on the straight line where the specific color is located.

These and other objects, features and advantages of the present invention are specifically set forth in or will become apparent from the following detailed descriptions of the invention when read in conjunction with the accompanying drawings.

DETAILED DESCRIPTIONS

Embodiments of the image formation apparatus and method, and the computer program according to the present invention will be explained in detail below with reference to the accompanying drawings.

A first embodiment of this invention will be explained below.

Figure 1:
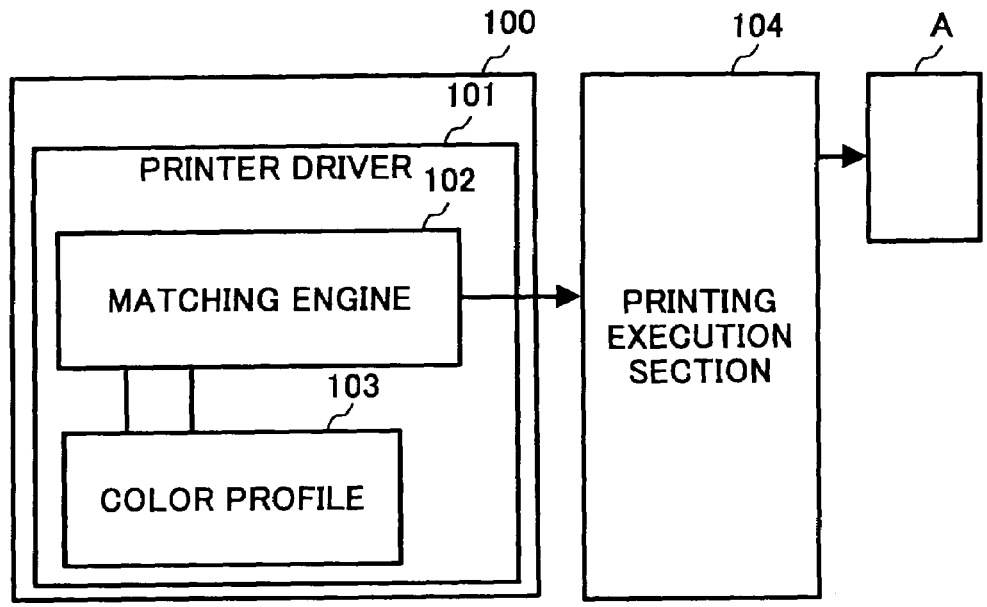
FIG. 1 shows a color printer according to a first embodiment of the present invention.

FIG. 1 shows the overall configuration of a color printer being an image formation apparatus according to the first embodiment. The shown color printer outputs a color image by a plurality of ink colors or by mixing ink colors. It is assumed that the color printer in the first embodiment is provided with four colors of cyan (C), magenta (M), yellow (Y), and black (B), and an image is formed using at least one color of these four colors.

Figure 2:
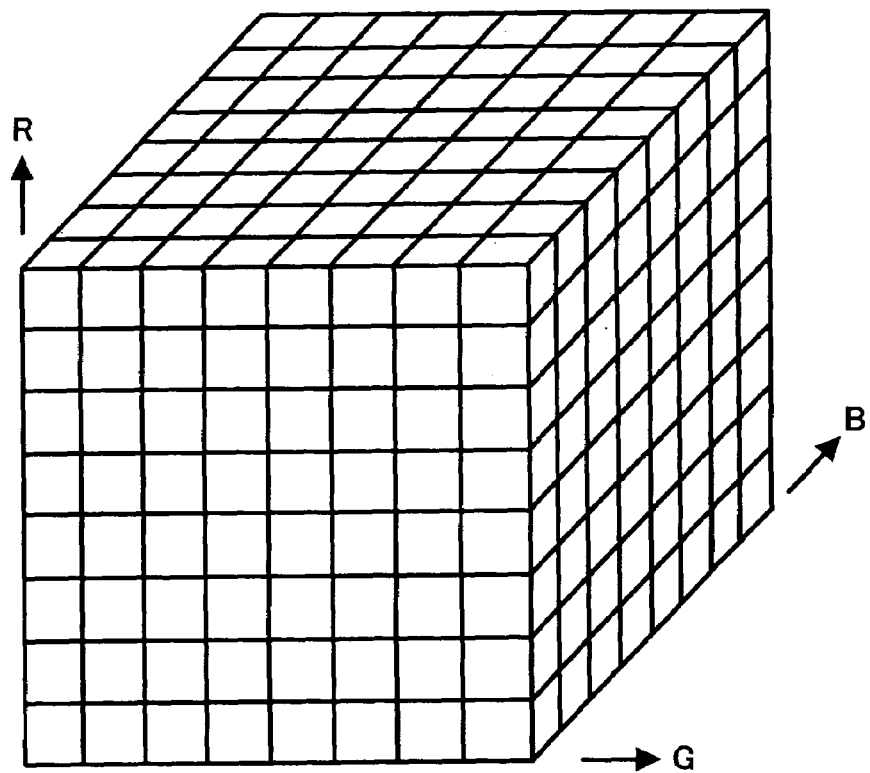
FIG. 2 shows a color conversion table in the color printer shown in FIG. 1.

The color printer in the first embodiment is constructed by connecting a host computer 100 to a printing execution section 104. The host computer 100 comprises a printer driver 101, and the printer driver 101 comprises a matching engine 102 and a color profile 103. The color profile 103 has a color conversion table shown in FIG. 2. The data of a color image (hereinafter referred to simply as image data) processed by the color printer is input from, for example, a computer (not shown) connected to the color printer.

The color conversion table is configured to convert the color in the image data into an output color when a color image is output, and is a three-dimensional LUT, in which a color space of the image data input to the matching engine 102 (input color space) is divided discretely. The color conversion table in the first embodiment is composed of three elements of R, G, and B. Each point determined by R, G, and B in the color conversion table corresponds to a color (output color) one to one at the time of printing by the color printer. The output color is a color resulting from color adjustment based on R, G, and B.

The matching engine 102 converts the color data converted by the color profile 103, using the color conversion table, into data capable of printing the whole base image data. The printable data is input to the printing execution section 104, and the printing execution section 104 forms the image on a sheet of paper A or the like, by driving an exposure apparatus (not shown) and the like, according to the printable data.

Figure 3:
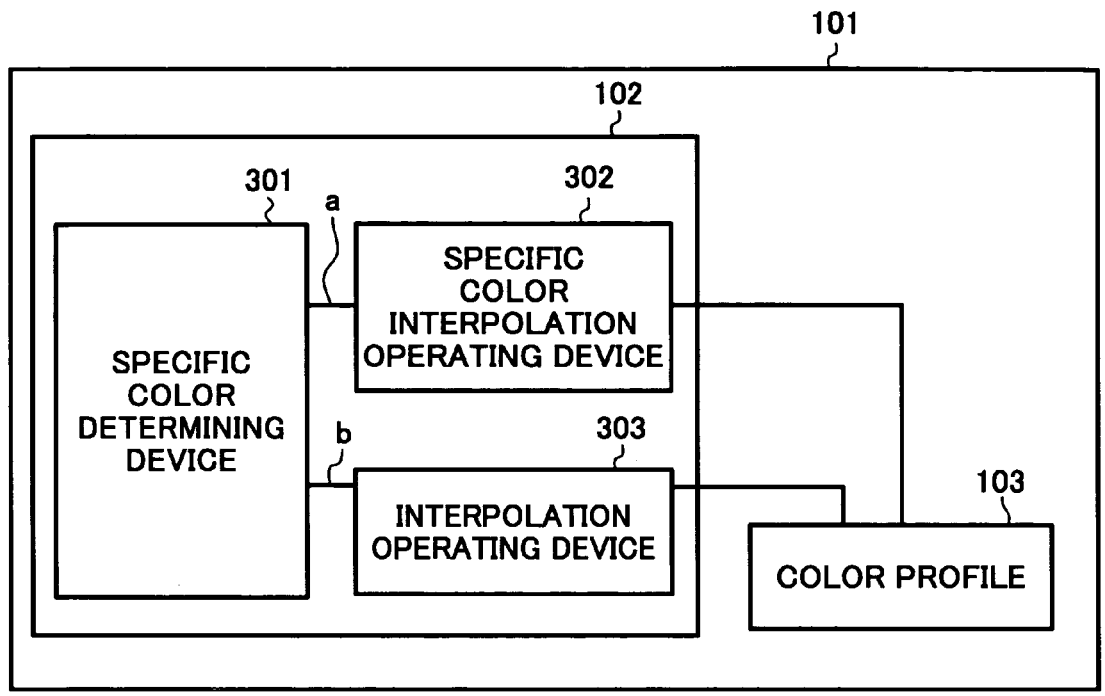
FIG. 3 shows a matching engine in the color printer shown in FIG. 1.

FIG. 3 shows the matching engine 102 in the first embodiment. The matching engine 102 comprises a specific color determining device 301 that determines whether the color in the image data is a color (specific color) indicated by a point on a straight line connecting between an origin point and a point indicating an ink color in the color space, or a non-specific color other than the specific color. The relation between the ink color and the specific color will be explained in detail later.

The matching engine 102 switches the conversion processing in the color profile 103 one to another for the image data determined as a specific color by the specific color determining device 301 and for the image data determined as a non-specific color. To do the switching, the matching engine 102 comprises a specific color interpolation operating device 302 that interpolates the image data determined as the specific color, using the color profile 103, and an interpolation operating device 303 that interpolates the image data determined as the non-specific color.

The specific color determining device 301 has a route "a" for outputting the image data to the specific color interpolation operating device 302, and a route "b" for outputting the image data to the interpolation operating device 303, and switches the conversion processing by selecting the route "a" or the route "b".

Figure 4:
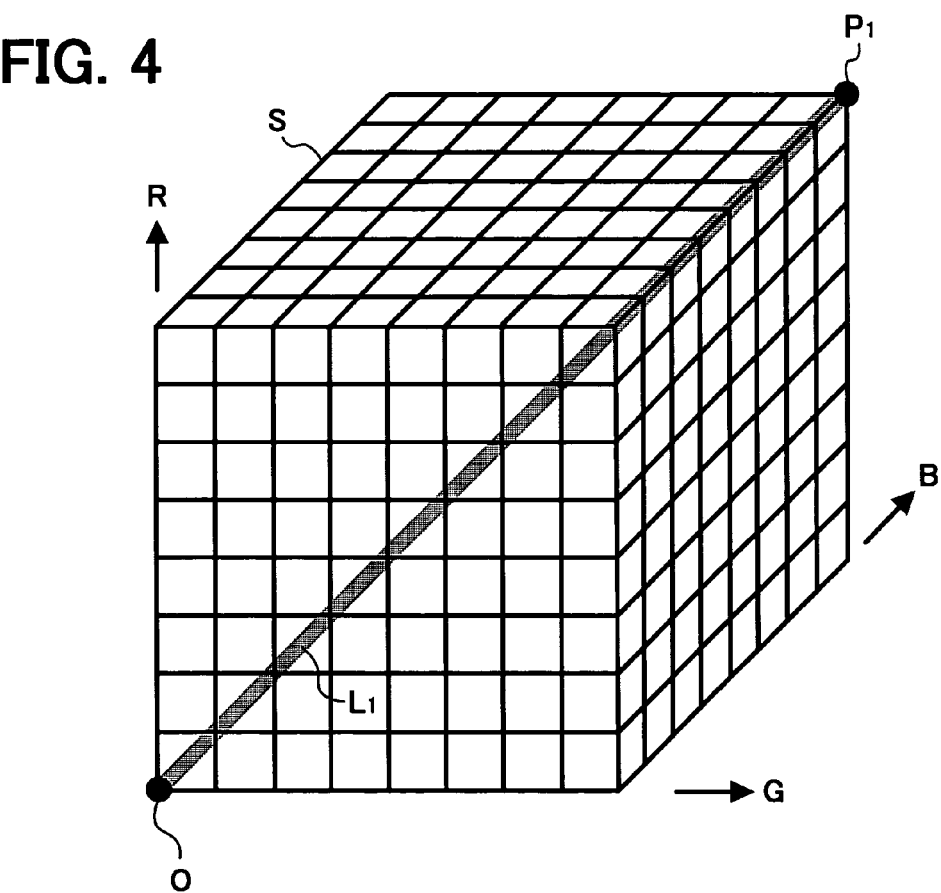
FIG. 4 shows a relation between an ink color and a specific color.
Figure 5:
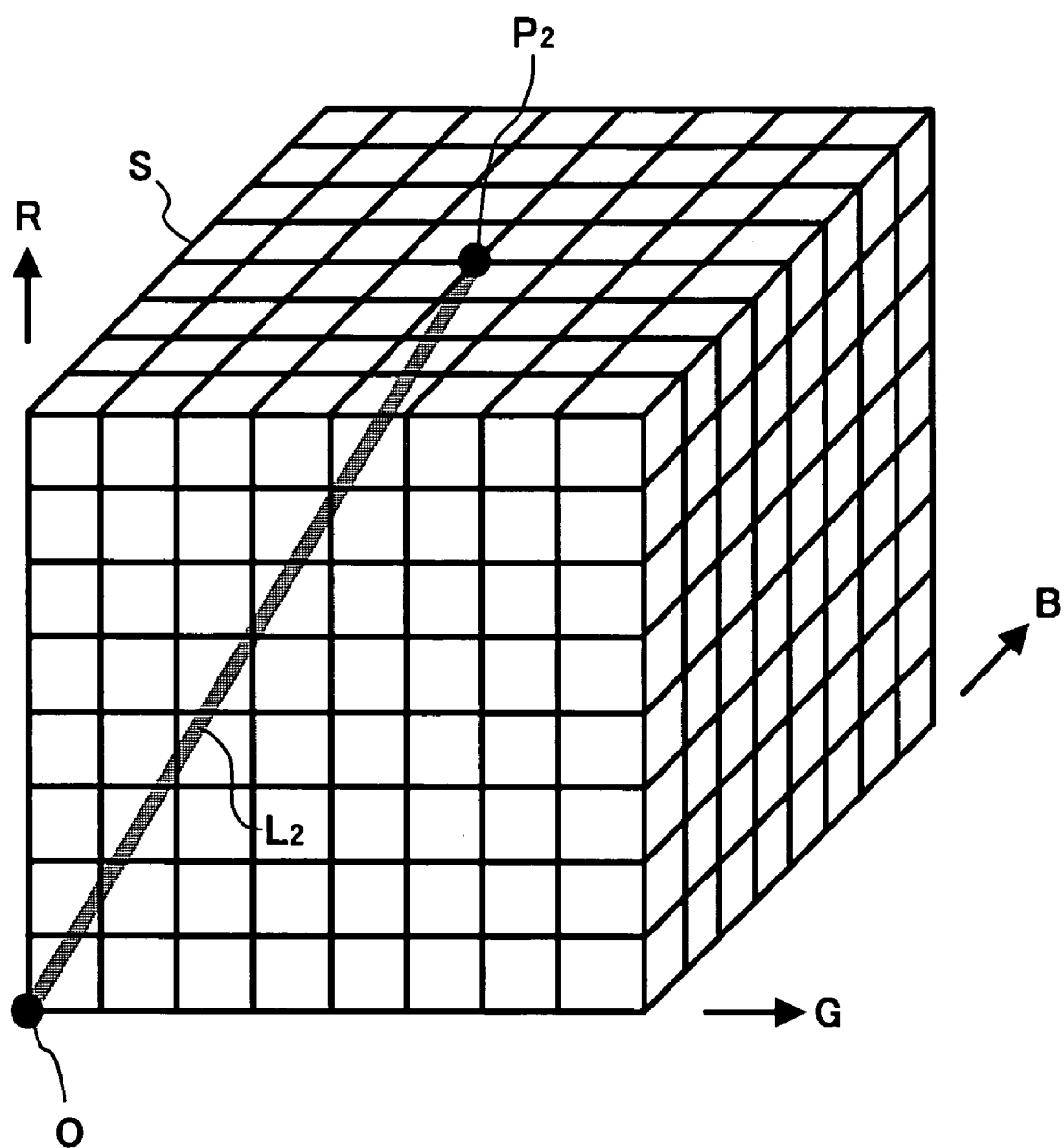
FIG. 5 shows another relation between an ink color and a specific color.

FIG. 4 and FIG. 5 show the relation between the ink colors and specific colors. FIG. 4 shows specific colors associated with a color (shown by a point P1) indicated by (255, 255, 255). When the color indicated by the point P1 (255, 255, 255) is converted into an output color, the color corresponds to the K color (ink color, black). Specific colors associated with the color indicated by the point P1 stand for colors located on a straight line L1 connecting between the origin point O (white) and the point P1 (including colors located on the origin point O and the point P1) in the color conversion table.

FIG. 5 shows a specific color relating to a color indicated by a point P2 (255, 128, 128). Specific colors associated with the ink color indicated by the point P2 (255, 128, 128) stand for colors located on a straight line L2 connecting between the origin point O and the point P2 (including colors located on the origin point O and the point P2) in the color conversion table.

Respective axes of R, G, and B in the color conversion table intersect straight lines (scales) "s" indicating predetermined data amounts, and colors indicated by points on each axis or points where the straight lines "s" intersect with each other are determined as model colors. Colors located between the model colors can be obtained by interpolation using the model colors, and the colors are converted into output colors.

The specific color determining device 301 shown in FIG. 3 determines specific colors associated with ink colors (for example, colors located on the straight line connecting between the point (255, 255, 255) and the origin point O, or colors located on the straight line connecting between the point (255, 128, 128) and the origin point O) and non-specific colors that are not the specific colors, from the image data input to the matching engine 102. The specific color determining device 301 then outputs the image data determined as the specific colors to the specific color interpolation operating device 302, and outputs the image data determined as the non-specific colors to the interpolation operating device 303.

The interpolation operating device 303 converts input colors input through the route "b" into output colors based on the color conversion table. Of the input colors, colors being the model colors in the color conversion table are converted to output colors corresponding to the model colors, and output to the printing execution section 104. Colors located between the model colors are interpolated by some of the model colors located at each apex of a cube including the input colors in the color space.

Interpolation made by the interpolation operating device 303 may be a known interpolation method. As the known interpolation method, various methods are proposed to increase the accuracy of interpolation and the processing speed, and a specific interpolation method differs according to the type of the method.

Figure 6:
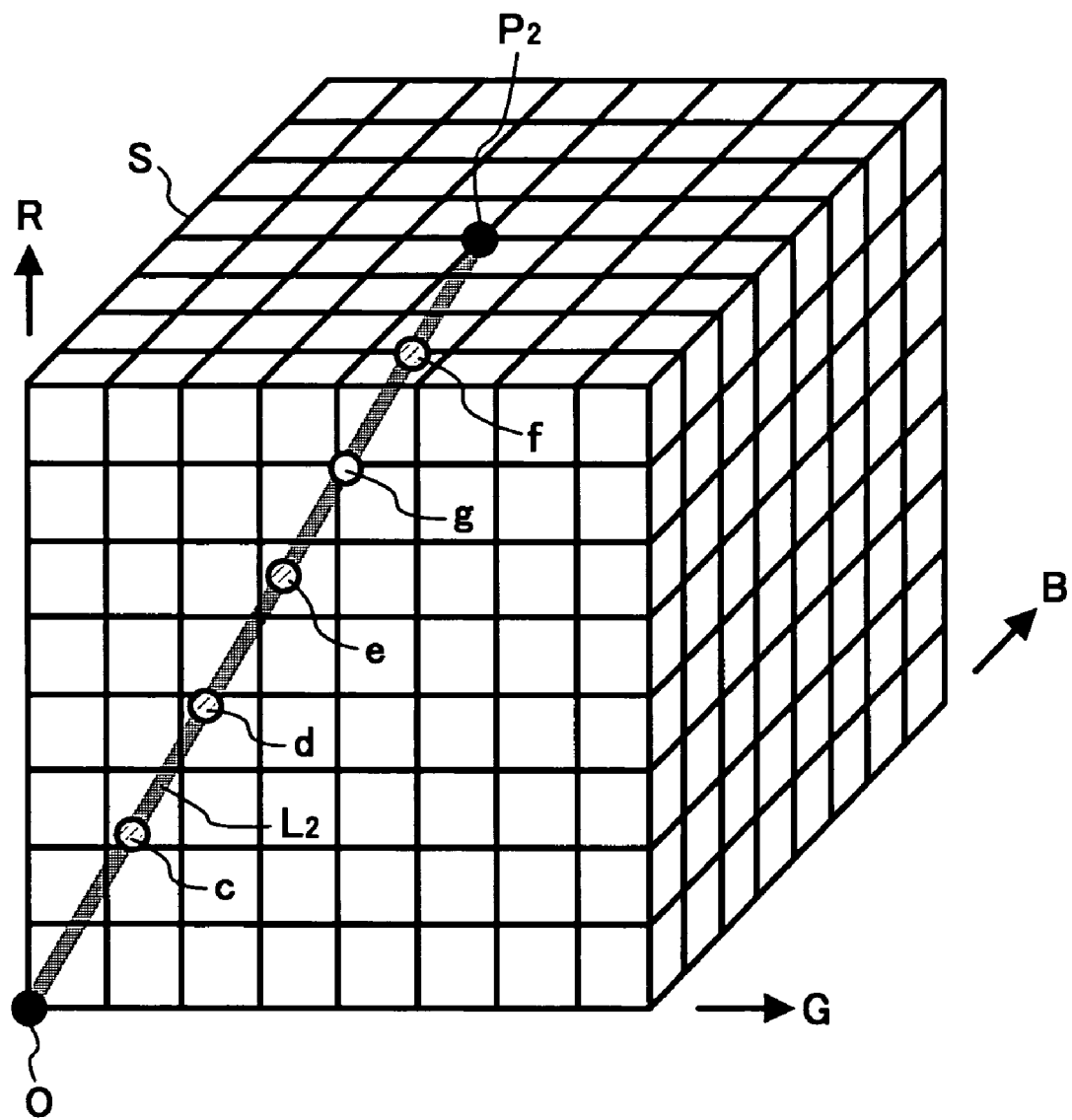
FIG. 6 shows the conversion processing of a specific color interpolation operating device shown in FIG. 3, FIG. 7A to FIG. 7D are graphs of each relation between image data and density in the output color indicated by the image data, for each color toner.
Figure 7A:
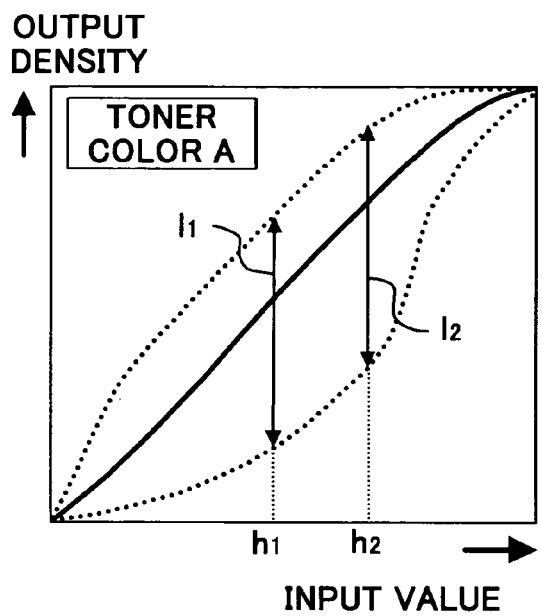
Figure 7B:
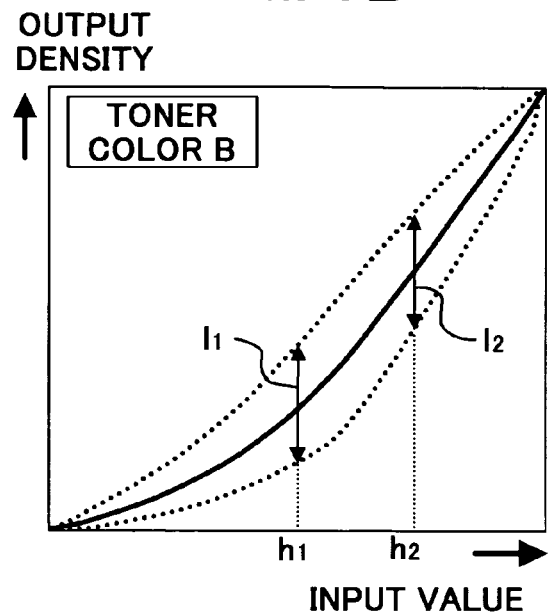
Figure 7C:
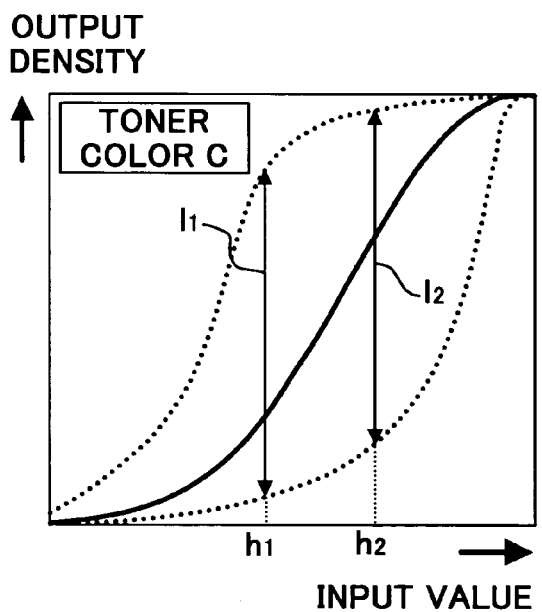
Figure 7D:
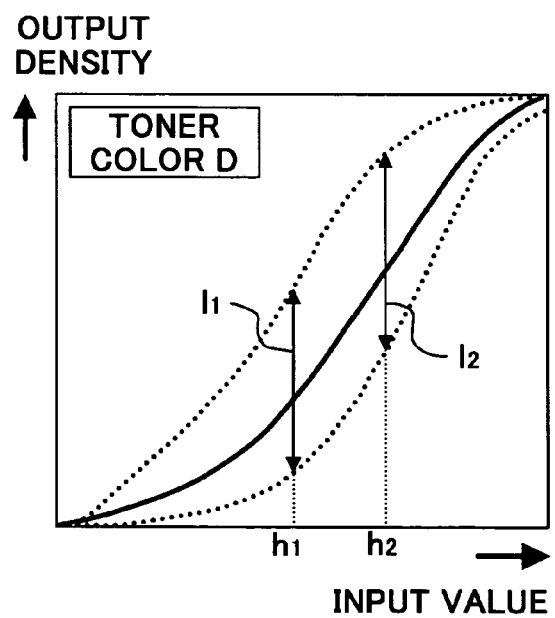

The specific color interpolation operating device 302 converts the image data input through the route "a" into an output color based on the color conversion table. FIG. 6 shows the conversion processing by the specific color interpolation operating device 302. When the image data input through the route "a" is a specific color associated with the point (255, 128, 128), colors in the image data are expressed by points on the line L2. In the illustrated example, the data indicated by points c to f of the image data shown on the line L2, have colors matching the representative points, and the image data indicated by point g has a color that does not match the representative point.

The specific color interpolation operating device 302 interpolates the specific color that does not match the representative point, by two-point interpolation using any of ink colors indicated by the points, the origin point, and the point P1 on the same straight line as that on which the specific color to be interpolated is. In other words, the specific color interpolation operating device 302 performs interpolation, using two points of the points c to f, the point O, and the point P1. In the first embodiment, the specific color to be interpolated is interpolated with model colors located at positions sandwiching a point on the same straight line as that on which the point indicating the specific color is, and hence, point g is interpolated using point e and point f. The model colors used for interpolation are specific colors associated with the ink color the same as the specific color to be interpolated, since these model colors are on the same straight line as that on which the point indicating the specific color is.

According to this interpolation, the specific color that does not match the model color can be interpolated only with two specific colors matching the model colors, of the specific colors associated with the same color. Therefore, an influence on the interpolation of point g given by model colors not on the straight line L2, can be suppressed as much as possible, and even when there is a fluctuation in the relation between the model colors and the output color, the color continuity from white towards point P2 can be maintained. Therefore, color discontinuity particularly noticeable by human can be eliminated, and a high quality image can be formed.

Selection of ink colors, of the image data, at the time of expressing a specific color, will be explained below. The color profile 103 converts the image data determined as a specific color by the specific color determining device 301 into an output color, by using only an ink color on the straight line connecting between the origin point and the specific color in the color space, or using at least one of an ink color in which a fluctuation in a output color, together with the specific color, converted with respect to a value of the image data is within a predetermined range (in this embodiment, a color difference (ΔE) with respect to the value of the image data within 3.2 (A class allowable color) is designated as an allowable range), and an ink color of yellow together with the specific color.

That is, the image data determined as a specific color is less affected by a fluctuation in an output color, when the output color is formed with only this specific color and ink colors on the straight line connecting between the origin point and this specific color. However, when the color in the image data is expressed with only the ink colors (referred to as basic ink colors) on the straight line connecting between the origin point and the specific color, an optimum color for a color on a monitor cannot be expressed, and therefore another ink color may be mixed. At this time, in the first embodiment, yellow, being an ink color such that a fluctuation in an output color is very small and the fluctuation is not easily recognized by human, is mixed with the basic ink color to form the output color.

FIG. 7A to FIG. 7D are graphs of each relation between the image data (input value) and a density of an output color (output density) expressing the color indicated by the image data, for each toner of color A, color B, color C, and color D. In each graph, a curve indicated by a solid line shows an ideal value of the output density. Broken lines show values as to how the output density may fluctuate. In FIG. 7A to FIG. 7D, input values h1 and h2 are written in each graph, and the range of fluctuations in the output density with respect to the input values h1 and h2 are shown as a fluctuation margin I1 and a fluctuation margin I2. The maximum value of the fluctuation margin each corresponds to the input value within the range of the input values h1 and h2. The fluctuation with respect to the ideal value of the output density is generally different for each color printer.

In the first embodiment, for example, the basic toner color is designated as a toner color A, of the toner colors A to D shown in FIG. 7A to FIG. 7D. The color design is determined beforehand so that if both of the fluctuation margins I1 and I2 of the toner color B and the toner color D are within a predetermined allowable range (an ink color having a fluctuation not larger than a color difference ΔE of 3.2), the toner color B and the toner color D are mixed with the toner color A, as required, to form the output color. Further, the color design is determined beforehand so that the toner color C is also mixed with the toner color A as required, to form the output color, if the toner color C is yellow in which fluctuation is not easily recognized by human even if the toner color C has the fluctuation margins I1 and I2 exceeding the predetermined range.

In the first embodiment, only a specific color is interpolated with two points of specific colors indicated by points on the same straight line as that where the specific color is, and other colors are color-converted by an existing method. Therefore, the specific color in which discontinuity is easily recognized by human can be color-converted, giving priority to elimination of the color discontinuity, and non-specific colors in which discontinuity is relatively inconspicuous can be color-converted, giving priority to the color balance rather than the color continuity. As a result, the color printer in the first embodiment can suppress the discontinuity of specific colors associated with the ink color as well as keeping a good color balance over the whole image.

Figure 8:
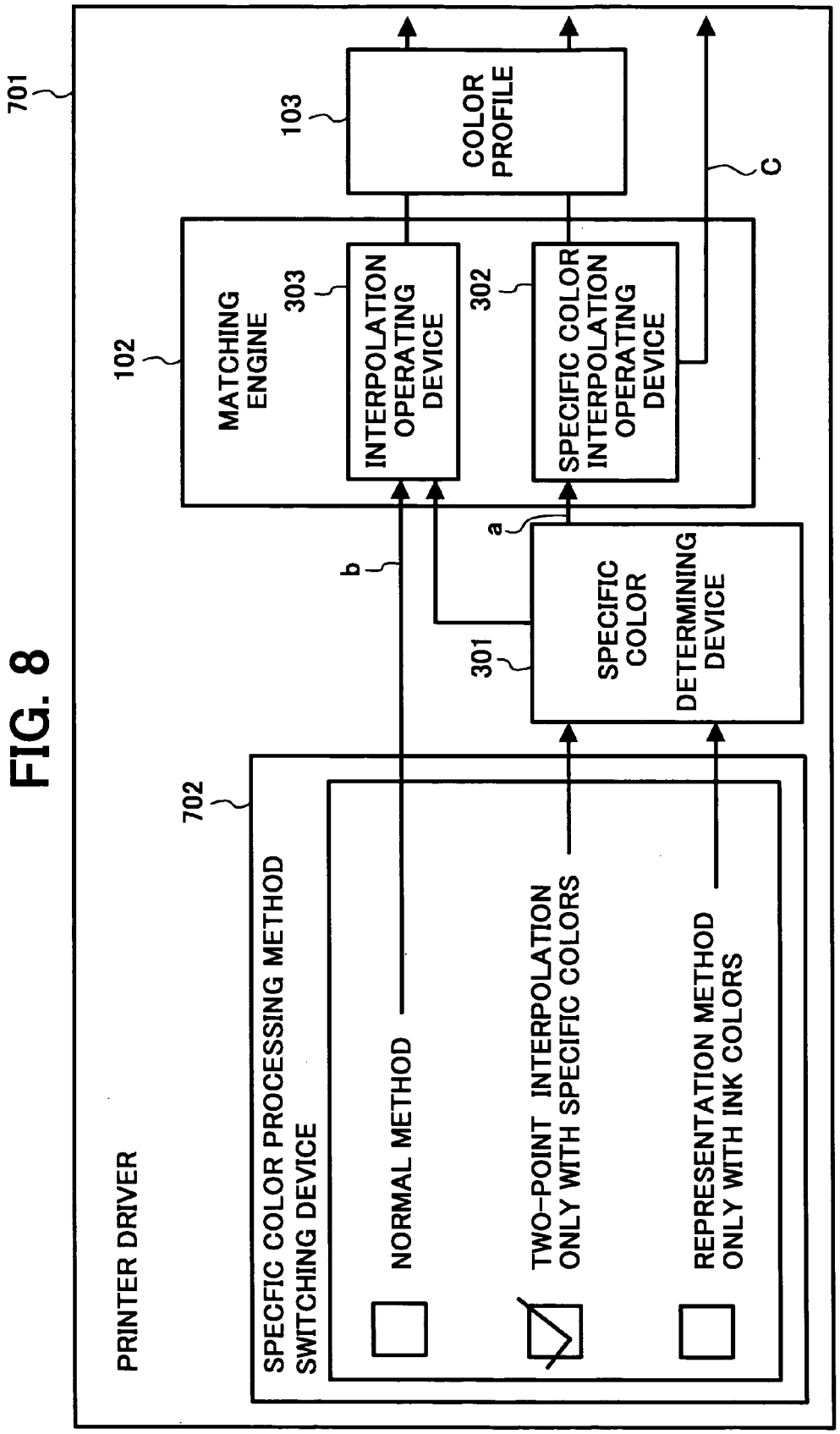
FIG. 8 shows a printer driver according to a second embodiment of the present invention.

A second embodiment of this invention will be explained below. In the second embodiment, however, the same configuration as that of the first embodiment is not shown and the explanation thereof is omitted. FIG. 8 shows a printer driver 701 in the second embodiment. The printer driver in the second embodiment comprises a specific color processing method switching device 702, in addition to the configuration of the printer driver 701.

The specific color processing method switching device 702 is configured to switch the conversion processing of the image data based on the input image data. In the second embodiment, the specific color processing method switching device 702 can switch the conversion processing into any one of a known method for interpolating a color between model colors, by some of the model colors located at each apex of a cube including the input color in the color space (shown as "normal method" in the figure), the conversion processing explained in the first embodiment (processing for interpolating a specific color between the model colors by two points of specific colors indicated by points on the same straight line as that where the specific color to be interpolated is when the image data determined as a specific color is interpolated (shown as "two-point interpolation only with specific colors" in the figure)), and the processing for converting a specific color into an ink color.

Of the conversion processing described above, the processing for converting a specific color into an ink color is for converting colors indicated by points on a straight line connecting between the origin point and the ink color into ink colors, without performing color matching. According to such processing, even when there is a fluctuation in the relation between the model colors and the output color, the fluctuation can be prevented from being influenced on the interpolation of the specific color. The processing for converting all specific colors into ink colors is particularly suitable when a sharp image such as a text is to be formed.

When the specific color processing method switching device 702 switches image data either to the conversion processing explained in the first embodiment or to the processing for converting a specific color in the data to an ink color, the image data is input to the specific color determining device 301. The specific color determining device 301 determines whether the image data is a specific color or a non-specific color, and outputs the image data with the non-specific color to the interpolation operating device 303 and outputs the image data with the specific color to the specific color interpolation operating device 302. When the specific color processing method switching device 702 switches the processing to "two-point interpolation only with specific colors", the specific color interpolation operating device 302 interpolates a color of the specific colors between model colors, by the method explained in the first embodiment using the color profile 103.

When the specific color processing method switching device 702 switches the processing to the "representation method only with the ink colors", the image data determined as specific colors by the specific color determining device 301 is output to the specific color interpolation operating device 302, and as shown by a route "c", all the specific colors are converted into ink colors without using the color profile 103.

The converted color in the image data is converted into an output color by the matching engine 102, and further converted into printable data to be output to the printing execution section 104. (FIG. 1). The printing execution section 104 prints the color image based on the image data.

Figure 9A:
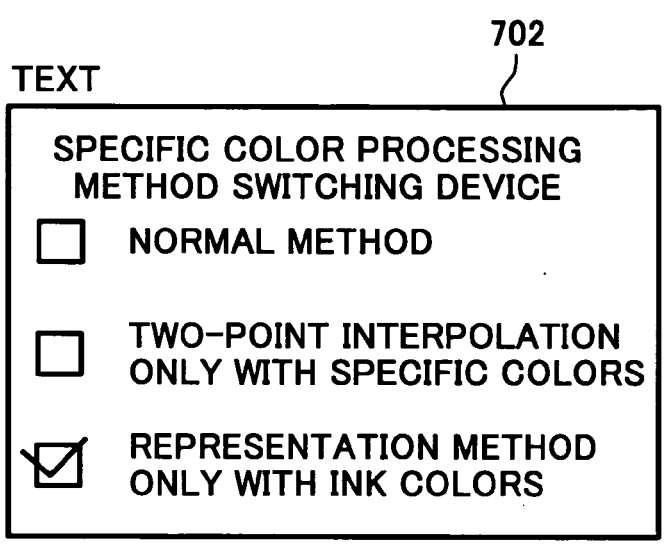
FIG. 9A to FIG. 9C show a relation between an image object and the interpolation operating processing, selected by a specific color switching device in the printer driver shown in FIG. 8.
Figure 9B:
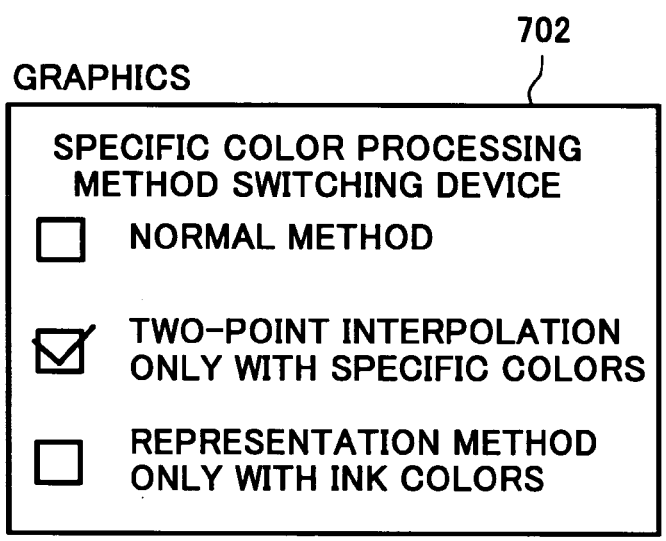
Figure 9C:
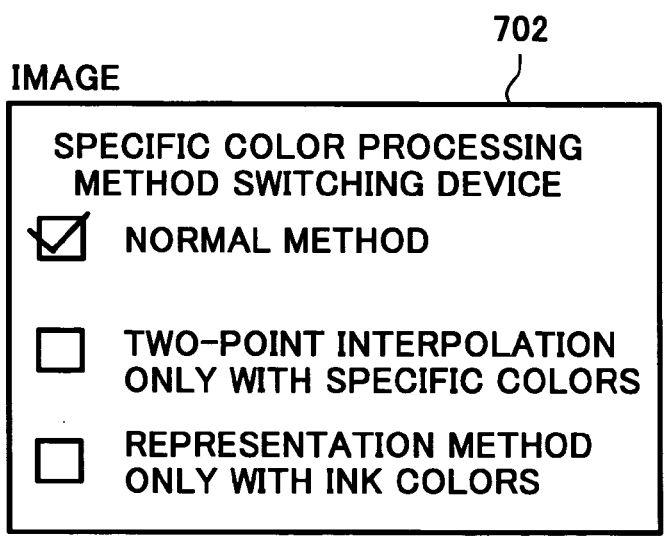

The specific color processing method switching device 702 in the second embodiment determines the type of the image, that is, what is a target of the image (object of the image), based on the image data. The objects in the image include, for example, text (characters), graphics (drawings), and images (photographs). FIG. 9A to FIG. 9C show the relation between the objects in the image switched by the specific color processing method switching device 702 and the processing for operating interpolation.

Figure 10B:
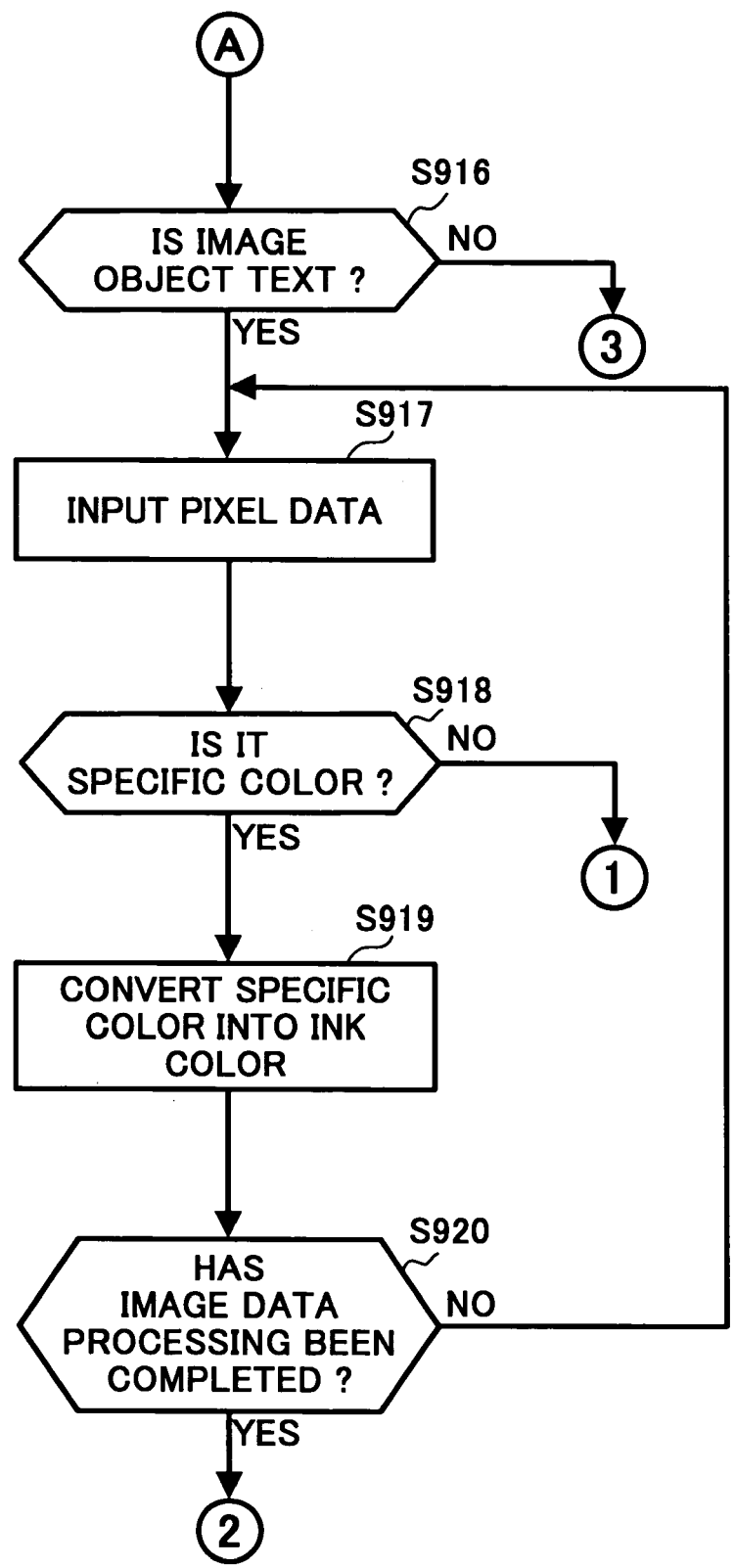
FIG. 10 shows a color printing method performed in the first embodiment and the second embodiment of the present invention.
Figure 11:
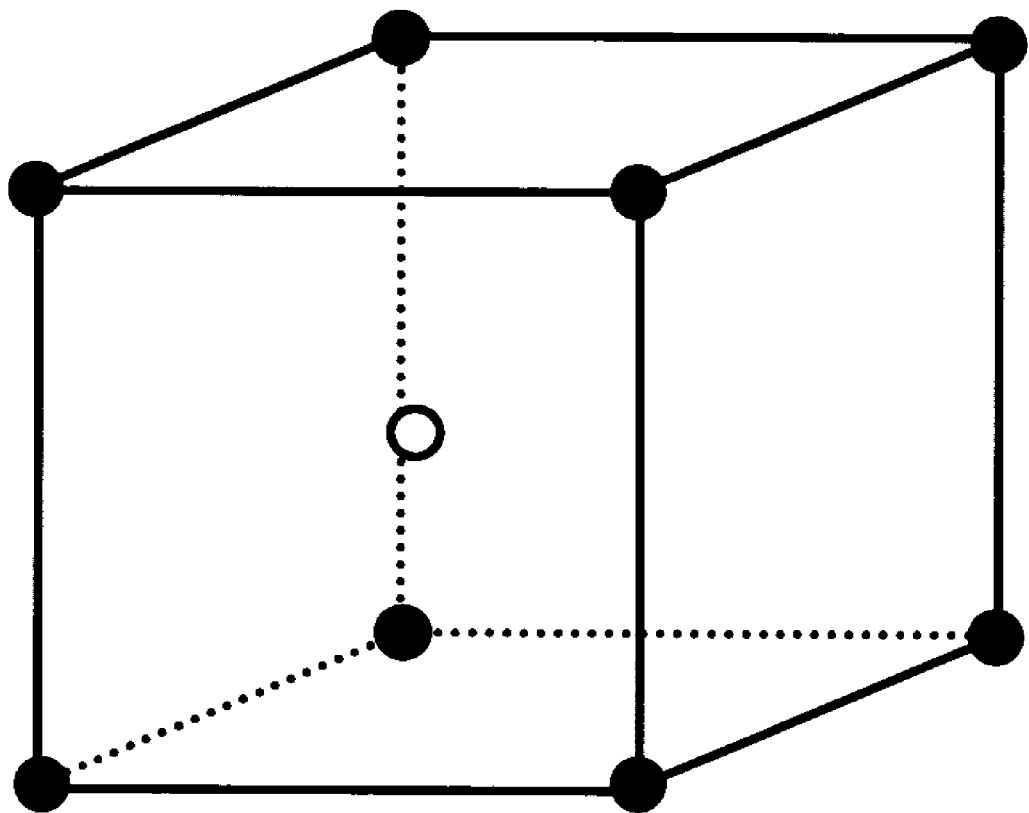
FIG. 11 shows model colors in a common color conversion table.

FIG. 10 shows a color printing method executed by color printers in the first embodiment and the second embodiment. The color printer according to the embodiments of the present invention determines the object of an image formed by the input image data. This determination is carried out by determining whether the image targets an image (photograph) (step S901). As a result of determination, if the object of the image is an image (photograph) (step S901, Yes), the pixel data constituting the image data is input to the specific color determining device 301 (step S902).

The specific color determining device 301 determines whether the input pixel data has a color matching the model color in the color conversion table (step S903). When the color indicated by the pixel data is not a model color (step S903, No), the color of the pixel data input by using plural pieces of data, of the color data indicated by each apex of a cube including the color data of the pixels in the color conversion table, is converted into an output color (step S904). At step S903, if it is determined that the color of the pixel data is a model color (step S903, Yes), the color of the pixel data is converted into an output color corresponding to the model color matching the color of the pixel data (step S905).

When the color conversion of the pixel data is finished, the color printer determines whether the processing of all pixel data in the image data to be processed has been completed (step S906). When it is determined that the processing of all pixel data has been completed (step S906, Yes), the whole image data is converted into printable print data (step S907). The print data is output to the printing execution section 104 (step S908), and is printed as a color image. At step S906, when it is determined that there is still unprocessed pixel data (step S906, No), the pixel data to be processed next is input, to continue the conversion processing of the pixel data to the output color.

At step S901, when it is determined that the object of the image is not an image (photograph) (step S901, No), it is determined whether the object is graphics (step S909). When it is determined that the object is graphics (step S909, Yes), the pixel data is input to the specific color determining device 301 (step S910).

The specific color determining device 301 determines whether the input pixel data is a specific color (step S911). When the color of the pixel data is a specific color (step S911, Yes), it is further determined whether the specific color matches a model color in the conversion table (step S912). When the color indicated by the pixel data is not a model color (step S912, No), the color is interpolated by using two points of the specific colors on the same line in the color conversion table (step S913). At step S912, when it is determined that the color of the pixel data is a model color (step S912, Yes), the color of the pixel data is converted into an output color corresponding to the model color matching the color of the pixel data (step S914). At step S911, when it is determined that the color of the pixel data is not a specific color (step S911, No), the process returns to step S903, to perform color conversion processing in the same manner as the image data in which the object is a text.

When the color conversion of the pixel data is finished, the color printer determines whether the processing of all pixel data in the image data to be processed has been completed (step S915). When it is determined that there is unprocessed pixel data (step S915, No), the pixel data to be processed next is input, to continue the conversion processing to the output color. Further, when it is determined that the processing of the pixel data has been completed (step S915, Yes), the whole image data is converted into printable print data (step S907).

Further, when it is determined, at step S909, that the object of the image is not graphics (step S909, No), it is determined whether the object is a text (step S916). When it is determined that the object of the image is not a text (step S916, No), the processing is terminated.

When it is determined that the image data is a text (step S916, Yes), the pixel data is input to the specific color determining device 301 (step S917). The specific color determining device 301 determines whether the input pixel data is a specific color (step S918). When the color of the pixel data is a specific color (step S918, Yes), this specific color is converted into an ink color associated with the specific color (step S919). On the other hand, when it is determined that the color of the pixel data is not a specific color (step S918, No), and at step S911, when it is determined that the color of the pixel data is not a specific color, the process returns to step S903, to perform color conversion processing in the same manner as the image data in which the object is an image.

When the color conversion of the pixel data is finished, the color printer determines whether the processing of all pixel data in the image data to be processed has been completed (step S920). When it is determined that there is unprocessed pixel data (step S920, No), the pixel data to be processed next is input, to continue the conversion processing of the pixel data to the output color. Further, when it is determined that the processing of the pixel data has been completed (step S920, Yes), the whole image data is converted into printable print data (step S907).

According to one aspect of the present invention, it is determined whether the image data is a specific color, being a color indicated by a point on a straight line connecting between the origin point and a point indicating the ink color in the color space, or is a non-specific color other than the specific color. The image data determined as the specific color is interpolated only with other specific colors on the straight line where the specific color is located. As a result, it is advantageously possible to provide the image formation apparatus capable of forming a high quality image by suppressing discontinuity in the output color due to a change in properties with time and an individual difference of the color printer relating to the specific color.

Moreover, a color indicated by the origin point in the color space, colors indicated by points on the straight line connecting between the origin point and the point indicating the ink color, and the ink (toner) color equipped in the color printer are determined as specific colors. Thus, it is advantageously possible to provide the image formation apparatus capable of preventing the continuity in the output color relating to an ink-color noticeable by human from being discontinued, and effectively preventing deterioration of the image quality.

Furthermore, the image data determined as the specific color is interpolated with two points on the straight line connecting between the origin point and the point indicating the ink color in the color space. Thus, it is advantageously possible to provide the image formation apparatus capable of executing the interpolation processing relatively easily and efficiently.

Moreover, the image data determined as the specific color is converted into the ink color, to thereby prevent a deviation of the non-specific color from affecting the interpolation of the specific color, and hence a sharp image can be formed.

As a result, it is advantageously possible to provide the image formation apparatus capable of forming a high quality image by suppressing discontinuity in the output color, particularly relating to the specific color, due to a change in properties with time and an individual difference of the color printer.

Furthermore, the image data determined as the specific color is converted into an output color, by using only an ink color on the straight line connecting between the original point and the ink color in the color space where the specific color is located, or using at least one of an ink color in which a fluctuation in an output color, together with the ink color, converted with respect to a value of the image data is within a predetermined range, and an ink color of yellow together with the ink color. As a result, it is advantageously possible to provide the image formation apparatus capable of preventing the continuity in the output color relating to the ink colors noticeable by human from being discontinued, and effectively preventing deterioration of the image quality.

Moreover, switching is carried out between the processing for interpolating the image data determined as the specific color only with colors indicated by points on the straight line connecting between the origin point and the point indicating the ink color in the color space or the processing for converting the specific color into the ink color, and the processing for interpolating the non-specific color with points constituting a cubic space including the non-specific color in the color space. As a result, it is advantageously possible to provide the image formation apparatus capable of forming a high quality image by performing the color conversion on the specific colors and non-specific colors by the suitable processing, respectively.

Furthermore, the processing of the color converting unit is switched according to the type of the image determined by the image determining unit that determines the type of the image, and therefore optimum color conversion processing can be applied, for example, to any one of an image representing a text, an image representing graphics, and an image representing a photograph. As a result, it is advantageously possible to provide the image formation apparatus capable of forming a high quality image, regardless of the object of the image.

According to another aspect of this invention, it is determined whether the image data is a specific color, being a color indicated by a point on the straight line connecting between the origin point and the point indicating the ink color in the color space, or a non-specific color other than the specific color. The image data determined as the specific color is then interpolated only with other specific colors on the straight line where the specific color is located. As a result, it is advantageously possible to provide the program capable of forming a high quality image by suppressing discontinuity in the output color, particularly relating to the specific color, due to a change in properties with time and an individual difference of the color printer.

Furthermore, a color indicated by the origin point in the color space, colors indicated by points on the straight line connecting between the origin point and the point indicating the ink color, and the ink (toner) color equipped in a color printer are determined as specific colors. Therefore, it is advantageously possible to provide the program for preventing the continuity in the output color relating to an ink color noticeable by human from being discontinued, and for effectively preventing deterioration of the image quality.

Moreover, the image data determined as the specific color is interpolated with two points on the straight line connecting between the origin point and the point indicating the ink color in the color space. Therefore, it is advantageously possible to provide the program for executing the interpolation processing relatively easily and efficiently.

Furthermore, the image data determined as the specific color is converted into the ink color, to thereby prevent a deviation of the non-specific color from affecting the interpolation of the specific color, and hence a sharp image can be formed. As a result, it is advantageously possible to provide the program for forming a high quality image by suppressing discontinuity in the output color, particularly relating to the specific color, due to a change in properties with time and an individual difference of the color printer.

Moreover, the image data determined as the specific color is converted into an output color by using only an ink color on the straight line connecting between the origin point and the ink color, or at least one of an ink color in which a fluctuation in a output color, together with the specific color, converted with respect to a value of the image data is within a predetermined range, and the ink color of yellow together with the specific color. As a result, it is advantageously possible to provide the program for preventing the continuity in the output color relating to the ink colors noticeable by human from being disrupted, and for effectively preventing deterioration of the image quality.

Furthermore, switching is carried out between the processing for interpolating the image data determined as the specific color only with colors indicated by points on the straight line connecting between the origin point and the point indicating the ink color in the color space or the processing for converting the specific color into the ink color, and the processing for interpolating the non-specific color with points constituting a cubic space including the non-specific color in the color space. As a result, it is advantageously possible to provide the program for forming a high quality image by performing the color conversion on specific colors and non-specific colors by the suitable processing, respectively.

Moreover, the processing in the color converting unit is switched according to the type of the image determined at the image determining step, and therefore optimum color conversion processing can be applied, for example, to any one of an image representing a text, an image representing graphics, and an image representing a photograph. As a result, it is advantageously possible to provide the program for forming a high quality image, regardless of the object of the image.

Furthermore, the color in the image data is converted into an output color, using the conversion table constituting the color space at the color converting step. Therefore, it is advantageously possible to provide the program for executing the processing for converting the color in the image data into the output color relatively easily.

According to still another aspect of this invention, it is determined whether the image data is a specific color, being a color indicated by a point on the straight line connecting between the origin point and the point indicating the ink color in the color space, or a non-specific color other than the specific color. The image data determined as the specific color is then interpolated only with other specific colors on the straight line where the specific color is located. As a result, it is advantageously possible to provide the image formation method capable of forming a high quality image by suppressing discontinuity in the output colors, particularly relating to the specific color, due to a change in properties with time and an individual difference of the color printer.

Furthermore, a color indicated by the origin point in the color space, colors indicated by points on the straight line connecting between the origin point and the point indicating the ink color, and the ink (toner) color equipped in the color printer are determined as the specific colors. Therefore, it is advantageously possible to provide the image formation method of preventing the continuity in the output color relating to an ink color noticeable by human from being disrupted, and effectively preventing deterioration of the image quality.

Moreover, the image data determined as the specific color is interpolated with two points on the straight line connecting between the origin point and the point indicating the ink color in the color space. Therefore, it is advantageously possible to provide the image formation method capable of executing the interpolation processing relatively easily and efficiently.

Furthermore, switching is carried out between the processing for interpolating the image data determined as the specific color only with colors indicated by points on the straight line connecting between the origin point and a point indicating the ink color in the color space or the processing for converting the specific color into the ink color, and the processing for interpolating the non-specific color with points constituting a cubic space including the non-specific color in the color space. As a result, it is advantageously possible to provide the image formation method capable of performing color conversion of specific colors and non-specific colors by the suitable processing, respectively, to form a high quality image.

Moreover, the processing in the color converting unit is switched according to the type of the image determined at the image determining step, and therefore optimum color conversion processing can be applied, for example, to any one of an image representing a text, an image representing graphics, and an image representing a photograph. As a result, it is advantageously possible to provide the image formation method capable of forming a high quality image, regardless of the object of the image.

The present document incorporates by reference the entire contents of Japanese priority document, 2001-392279 filed in Japan on Dec. 25, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image formation apparatus comprising:
   a color converting unit that converts a color in image data into an output color when a color image is to be output by using a plurality of ink colors or by mixing the ink colors; and
   an image data color determining unit that determines whether the color in the image data is a specific color that is indicated by a point on a straight line connecting between an origin point and a point indicating an ink color in a color space, or a non-specific color other than the specific color,
   wherein when the color in the image data is to be interpolated, the color converting unit interpolates the image data determined as the specific color by the image data color determining unit, only with other specific colors on the straight line where the specific color is located.

2. The image formation apparatus according to claim 1, wherein the image data color determining unit determines a color indicated by the origin point in the color space, a color indicated at the point on the straight line connecting between the origin point and the point indicating the ink color, and the ink color, as specific colors.

3. The image formation apparatus according to claim 1, wherein the color converting unit interpolates the image data determined as the specific color with two points on the straight line connecting between the origin point and the point indicating the ink color in the color space.

4. The image formation apparatus according to claim 1, wherein the color converting unit converts the image data determined as the specific color by the image data color determining unit into the ink color.

5. The image formation apparatus according to claim 1, wherein the color converting unit converts the image data determined as the specific color into an output color, by using only an ink color on the straight line where the specific color is located in the space color, or using at least one of an ink color in which a fluctuation in an output color, together with the ink color, convened with respect to a value of the image data is within a predetermined range.

6. The image formation apparatus according to claim 5, further comprising an image determining unit that determines a type of the image determined by an object expressed by the image, wherein the conversion processing switching unit switches the processing of the color converting unit one to another, according to the type of the image determined by the image determining unit.

7. The image formation apparatus according to claim 1, wherein the color converting unit further comprises a conversion processing switching unit that switches between the processing for interpolating the image data determined as the specific color only with colors indicated by points on the straight line connecting between the origin point and the point indicating the ink color in the color space or the processing for converting the specific color into an ink color, and processing for interpolating the non-specific color with points constituting a cubic space including the non-specific color in the color space.

8. The image formation apparatus according to claim 1, wherein each of the specific colors on the straight line is associated with the ink color.

9. A computer readable medium tangibly embodying a program executable by a computer to perform an image formation method, the method comprising steps of:
converting a color in image data to an output color when a color image is to be output by using a plurality of ink colors or by mixing the ink colors; and
determining whether the color in the image data is a specific color that is indicated by a point on a straight line connecting between an origin point and a point indicating an ink color in a color space, or a non-specific color other than the specific color,
wherein when the color in the image data is to be interpolated, the color converting step includes interpolating the image data determined as the specific color at the determining step, only with other specific colors on the straight line where the specific color is located.

10. The computer readable medium according to claim 9, wherein at the color converting step, the image data determined as the specific color is interpolated with two points on the straight line connecting between the origin point and the point indicating the ink color in the color space.

11. The computer readable medium according to claim 9, wherein at the color converting step, the image data determined as the specific color at the step of determining the color in the image data is convened into the ink color.

12. The computer readable medium according to claim 9, wherein at the color converting step, the image data determined as the specific color is converted into an output color, by using only an ink color on the straight line where the specific color is located in the color space, or using at least one of an ink color in which a fluctuation in an output color, together with the ink color, converted with respect to a value of the image data is within a predetermined range, and an ink color of yellow together with the ink color.

13. The computer readable medium according to claim 9, wherein the color converting step further includes a conversion processing switching step of switching between the processing for interpolating the image data determined as the specific color only with colors indicated by points on the straight line connecting between the origin point and the point indicating the ink color in the color space or the processing for converting the specific color into the ink color, and the processing for interpolating the non-specific color with points constituting a cubic space including the non-specific color in the color space.

14. The computer readable medium according to claim 13, further comprising an image, determining step of determining a type of the image determined by an object expressed by the image, wherein the conversion processing switching step includes switching the processing at the color converting step according to the type of the image determined at the image determining step.

15. The computer readable medium according to claim 9, wherein the color converting step further includes converting the color in the image data into an output color, using a conversion table constituting the color space.

16. The computer readable medium according to claim 9, wherein at the determining step, the color indicated by the origin point in the color space, colors indicated by points on the straight line connecting between the origin point and the point indicating the ink color, and the ink color are determined as specific colors.

17. An image formation method comprising steps of:
converting a color in image data to an output color when a color image is to be output by using a plurality of ink colors or by mixing the ink colors; and
determining whether the color in the image data is a specific color that is indicated by a point on a straight line connecting between an origin point and a point indicating an ink color in a color space, or a non-specific color other than the specific color,
wherein when the color in the image data is to be interpolated, the color converting step includes interpolating the image data determined as the specific color at the determining step, only with other specific colors on the straight line where the specific color is located.

18. The image formation method according to claim 17, wherein at the color converting step, the image data determined as the specific color is interpolated with two points on the straight line connecting between the origin point and the point indicating the ink color in the color space.

19. The image formation method according to claim 17, wherein the color converting step further includes a conversion processing switching step of switching between the processing for interpolating the image data determined as the specific color only with colors indicated by points on the straight line connecting between the origin point and the point indicating the ink color in the color space or the processing for converting the specific color into the ink color, and the processing for interpolating the non-specific color with points constituting a cubic space including the non-specific color in the color space.

20. The image formation method according to claim 19, further comprising an image determining step of determining a type of the image determined by an object expressed by the image, wherein the conversion processing switching step includes switching the processing at the color converting step according to the type of the image determined at the image determining step.

21. The image formation method according to claim 17, wherein at the determining step, the color indicated by the origin point in the color space, colors indicated by points on the straight line connecting between the origin point and the point indicating the ink color, and the ink color, are determined as specific colors.

\* \* \* \* \*